(12) United States Patent
McAuley et al.

(10) Patent No.: US 8,407,029 B2
(45) Date of Patent: Mar. 26, 2013

(54) UNIFIED GRAPH MATCHING IN EUCLIDEAN SPACES AND APPLICATIONS TO IMAGE COMPARISON AND RETRIEVAL

(75) Inventors: Julian McAuley, Canberra (AU); Teofilo E. de Campos, Guildford (GB)

(73) Assignee: Xerox Corporation, Norwalk, CT (US)

( * ) Notice: Subject to any disclaimer, the term of this patent is extended or adjusted under 35 U.S.C. 154(b) by 813 days.

(21) Appl. No.: 12/571,630

(22) Filed: Oct. 1, 2009

(65) Prior Publication Data

US 2011/0082670 A1 Apr. 7, 2011

(51) Int. Cl.
*G06F 7/60* (2006.01)
*G01V 3/00* (2006.01)
*G06T 15/00* (2011.01)

(52) U.S. Cl. .................... 703/2; 706/2; 345/419
(58) Field of Classification Search .......... 703/2; 706/2; 345/419
See application file for complete search history.

(56) References Cited

U.S. PATENT DOCUMENTS

| | | | |
|---|---|---|---|
| 2004/0150640 A1* | 8/2004 | Park et al. ................ | 345/419 |
| 2005/0094898 A1* | 5/2005 | Xu et al. ................... | 382/294 |

OTHER PUBLICATIONS

Caetano et al., "A unified formulation of invariant point pattern matching," ICPR, vol. 3, 18th International Conference on Pattern Recognition (ICPR '06) (2006).
McAuley et al., "Graph rigidity, cyclic belief propagation and point pattern matching," IEEE Trans. PAMI 30(11), pp. 2047-2054, (2008).
Caetano et al., "Faster graphical models for point-pattern matching," Spatial Vision, 2009.
Caetano et al., "Learning graph matching," IEEE Transaction on Pattern Analysis and Machine Intelligence, vol. 31, No. 6, Jun. 2009.
McAuley et al., "Robust near-isometric matching via structured learning of graphical models," NIPS (2008).
Ramanan et al., "Finding and tracking people from the bottom up," CVPR (2003).
Felzenszwalb et al., "A discriminatively trained, multiscale, deformable part model," In CVPR (2008).
Fergus et al., "Weakly Supervised Scale-Invariant Learning of Models for Visual Recognition," International Journal of Computer Vision, vol. 71(3), 273-303, Mar. 2007.
Bouchard et al., "Hierarchical Part-Based Visual Object Categorization," CVPR 2005.
Blostein, "Graph Transformation in Document Image Analysis: Approaches and Challenges," In Graph-Based Representations in Pattern Recognition, LNCS 3434, pp. 23-34, 2005.
Conte et al., "Thirty Years of Graph Matching in Pattern Recognition," International Journal of Pattern Recognition and Artificial Intelligence, vol. 18, No. 3, pp. 265-298, 2008.
Cook et al., "Structural mining of molecular biology data," Engineering in Medicine and Biology Magazine, IEEE, vol. 220, Issue 4, pp. 67-74, Jul.-Aug. 2001.

* cited by examiner

*Primary Examiner* — Omar Fernandez Rivas
*Assistant Examiner* — Nithya Moll
(74) *Attorney, Agent, or Firm* — Fay Sharpe LLP

(57) ABSTRACT

A first graph embedded in a Euclidean space is modeled by a globally rigid first model graph that includes all vertices and edges of the first graph and has a preselected maximum clique size. The modeling is configured to maintain the preselected maximum clique size by employing an edge adding process that replicates a vertex of a vertex pair connected by an edge. A mapping between vertices of the first graph and vertices of a second graph is computed by optimizing a mapping between vertices of the first model graph and vertices of the second graph.

20 Claims, 4 Drawing Sheets

UNIFIED GRAPH MATCHING IN EUCLIDEAN SPACES AND APPLICATIONS TO IMAGE COMPARISON AND RETRIEVAL

BACKGROUND

The following relates to the pattern matching arts, graph matching arts, information comparison and retrieval arts, image comparison and retrieval arts, object comparison and retrieval arts, and related arts.

Objects such as two- and three-dimensional images, proteins, and so forth can be represented as geometrical objects in space, in which the representation is in the form of a graph embedded in a Euclidean space. Such a graph includes: (i) nodes, which can be thought of as points in the Euclidean space; and (ii) edges, which can be thought of as edges connecting pairs of nodes. A node optionally may have attributes or features such as color, size, shape context, atom type (in the case of a protein object) or so forth. An edge optionally may have attributes or features such as distance in the Euclidean space, or topological features such as an indicator feature (for example, having a value "1" if the edge is present between the pair of nodes in the graph and a value of "0" if the edge is not present) or a shortest-path distance feature (a measure of the shortest path along edges of the graph between the pair of nodes), a chemical bond type or strength (in the case of a protein object), or so forth. Still further, higher order attributes or features (for example, third order features) can also optionally be defined, such as angles between a set of three nodes (in which one of the three nodes is defined as the angle vertex) or shape of a triangle defined by a set of three nodes.

A graph embedded in Euclidean space and including suitable node, edge, or higher order attributes can provide a rich description of an object such as an image (or, an object within an image such as an image of a dog within a photograph) or the three-dimensional structure of a folded protein, or so forth. Graphs can thus be used in objects comparison, object retrieval, database indexing, or other applications. The comparison of graphs is known as graph matching, and is a type of pattern matching problem.

There are numerous graph similarity measures usable for graph matching, with a few representative measures outlined below. The following notation is used herein. A graph $\mathcal{G}$ is represented by a set of node or vertices $V$ and a set of edges $E$, that is, $\mathcal{G}=(V,E)$. A node or vertex is denoted $p$, a pair of nodes or vertices is denoted $(p_i,p_j)$ (where $i,j$ are node index values), and the set of all possible pairs of nodes or vertices $(p_i,p_j)$, regardless of whether there is an edge between them, is denoted $V^2$. For the purpose of graph matching, the graph $\mathcal{G}=(V,E)$ is matched with a graph $\mathcal{G}'=(V',E')$ by identifying a vertex mapping $f:V \rightarrow V'$ that optimizes a match criterion denoted herein as g. In the examples herein, the match criterion g is a cost function that is to be minimized; however, a match criterion that is to be maximized is also contemplated.

Isometry is a graph similarity measure that considers the nodes without reference to the presence or absence of edges or the topology. The isometry cost function g is suitably written as:

$$g_{isometric}(\mathcal{G},\mathcal{G}') = \underset{f:V \rightarrow V'}{\operatorname{argmin}} \left\{ \sum_{(p_1,p_2) \in V^2} |d(p_1,p_2) - d(f(p_1),f(p_2))| \right\} \quad (1)$$

where $f(p_i)$ denotes the node or vertex to which the node or vertex $p_i$ maps in the graph $\mathcal{G}'=(V',E')$ using the mapping $f:V \rightarrow V'$, and the function $d(\ldots)$ denotes a distance measure in the Euclidean space. For an exact match, $d(p_1,p_2)=d(f(p_1),f(p_2))$ for every pair of nodes or vertices in $V^2$. The isometry measure does not consider the node attributes or the presence or absence of edges, but rather searches for a set of nodes in $\mathcal{G}'=(V',E')$ that optimally match the locations of the nodes of the graph $\mathcal{G}=(V,E)$.

Isomorphism and homeomorphism are graph similarity measures that include the isometry aspect and also incorporate similarity of the edges. For isomorphism, the cost function can be written as:

$$g_{isomorphic}(\mathcal{G},\mathcal{G}') = \underset{f:V \rightarrow V'}{\operatorname{argmin}} \left\{ \sum_{(p_1,p_2) \in V^2} |d(p_1,p_2) - d(f(p_1),f(p_2))| + \sum_{(p_1,p_2) \in E} |1 - I_{E'}[(f(p_1),f(p_2))]| \right\} \quad (2)$$

The argument of the summation of the second term, namely $|1-I_{E'}(f(p_1),f(p_2))|$, is derived from the expression $|I_E(p_1,p_2) - I_{E'}(f)(p_1),f(p_2))|$ which has value "0" if there is an edge between $(p_1,p_2)$ in $\mathcal{G}$ and between $(f(p_1),f(p_2))$ in $\mathcal{G}'$. The simplification to $|1-I_{E'}(f(p_1),f(p_2))|$ results because the summation is only over those point pairs $(p_1,p_2)$ in $\mathcal{G}$ that have edges (that is, $I_E(p_1,p_2)=1$ for all $(p_1,p_2) \in E$). Homeomorphism differs from isomorphism in that homeomorphism allows for intervening nodes in edges of the graph $\mathcal{G}'$. This can be accounted for by modifying Equation (2) as follows:

$$g_{homeomorphic}(\mathcal{G},\mathcal{G}') = \underset{f:V \rightarrow V'}{\operatorname{argmin}} \left\{ \sum_{(p_1,p_2) \in V^2} |d(p_1,p_2) - d(f(p_1),f(p_2))| + \sum_{(p_1,p_2) \in E} |d(p_1,p_2) - spd_{E'}(f(p_1),f(p_2))| \right\} \quad (3)$$

where $d(p_1,p_2)$ is the length of the edge in Euclidean space between points $(p_1,p_2) \in E$, and $spd_{E'}(f(p_1),f(p_2))$ is the shortest path distance between points $(f(p_1),f(p_2))$ along paths in the set of paths E' of the graph $\mathcal{G}'$.

The various graph similarity measures have different utility for different applications. In general, one may expect isometric, isomorphic, and/or homeomorphic similarity measures to be useful in varying degrees for different object comparison problems. Moreover, none of Equations (1)-(3) take into account attributes of nodes, edges, or higher-order attributes. These may also be useful in varying degrees for different object comparison problems. In general, it is not apparent a priori which graph similarity measure or combination of measures is optimal for a given application.

BRIEF DESCRIPTION

In some illustrative embodiments disclosed as illustrative examples herein, a method comprises: representing a first graph in Euclidean space by a first model graph that includes all vertices of the first graph and all edges of the first graph and is globally rigid and has a preselected maximum clique size; and computing a similarity measure comparing the first graph and a second graph by optimizing a mapping between vertices of the first model graph and mapped vertices of the second graph respective to a cost function; wherein the representing operations and the computing operation are performed by a digital processor.

In some illustrative embodiments disclosed as illustrative examples herein, a storage medium stores instructions executable by a digital processor to perform a method operative on graphs embedded in a Euclidean space of dimensionality n, the method comprising: representing a first graph in the Euclidean space by a first model graph by (i) adding all vertices of the first graph to the first model graph with edges between the vertices sufficient to maintain global rigidity with a maximum clique size less than or equal to n+2, and (ii) adding any missing edges that are included in the first graph but are missing from the first model graph by adding one or more replicate vertices of the first graph to the first model graph and adding the missing edge or edges connecting with the replicate vertex or vertices; and computing a mapping between vertices of the first graph and vertices of a second graph by optimizing a mapping between vertices of the first model graph and vertices of the second graph.

In some illustrative embodiments disclosed as illustrative examples herein, an apparatus comprises a digital processor configured to perform a method operative in a Euclidean space of dimensionality n, the method including: modeling a first graph embedded in the Euclidean space by a globally rigid first model graph that includes all vertices and edges of the first graph and has a preselected maximum clique size; and computing a mapping between vertices of the first graph and vertices of a second graph by optimizing a mapping between vertices of the first model graph and vertices of the second graph; wherein the modeling is configured to maintain the preselected maximum clique size of the first model graph by employing an edge adding process that replicates a vertex of a vertex pair connected by an edge.

DETAILED DESCRIPTION

Figure 1:
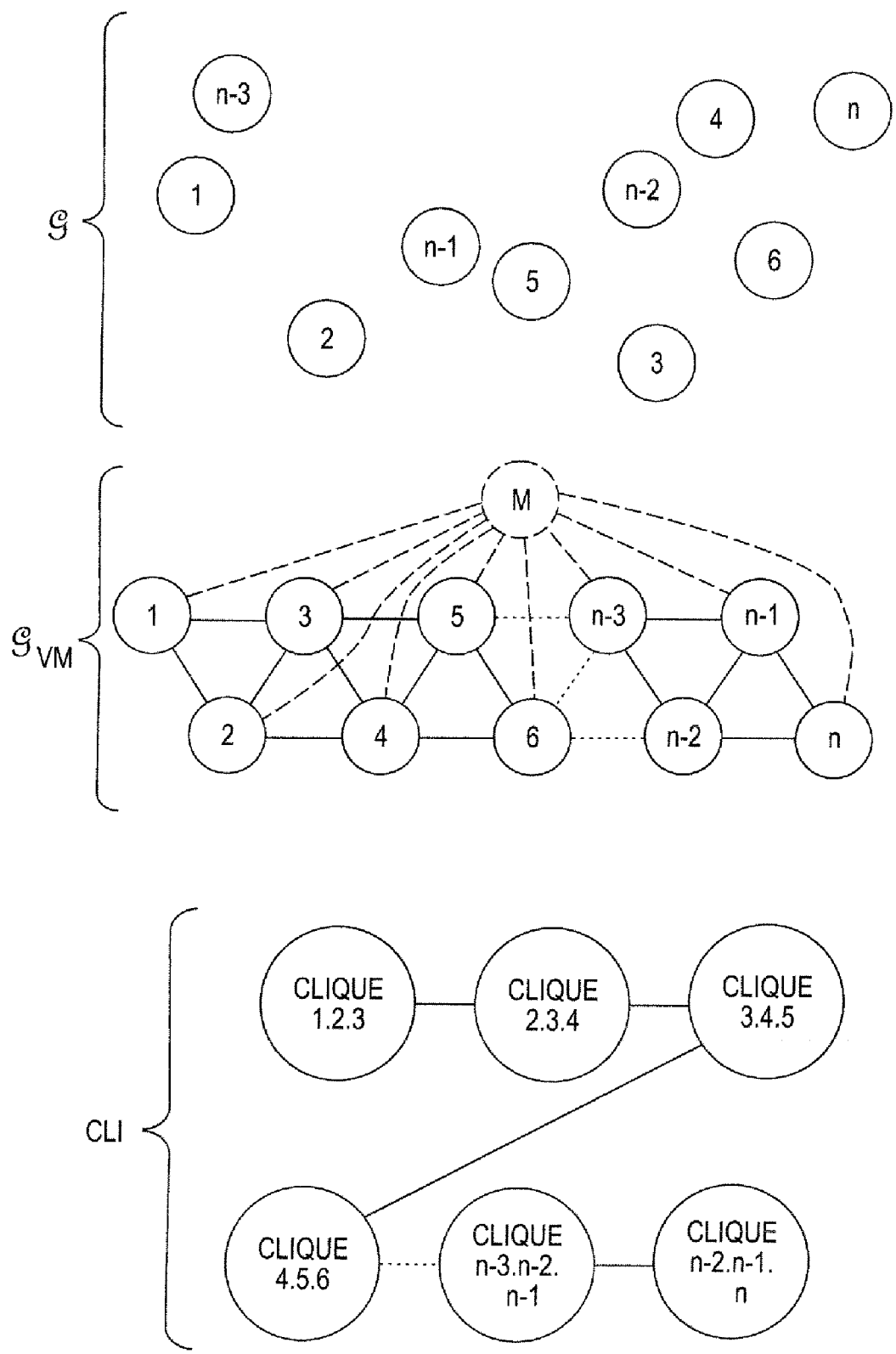
FIGS. 1 and 2 diagrammatically show generation of a globally rigid model graph $\mathcal{G}_M = (V^{ext}, E^M)$ of low maximal clique size which models a graph $\mathcal{G} = (V, E)$ embedded in a Euclidean space.

The graph comparison techniques disclosed herein entail generating a model graph representing an original graph to be compared with another graph, in which the model graph typically includes more vertices than the original graph. Surprising, this nonetheless substantially reduces computation time because the model graph is configured to be of small maximal clique size while still being fully representative of the vertices and edges of the original graph, including any features of the vertices, edges, or higher order features. As shown herein, the maximum clique size can be reduced to as small as three (or, more generally, to as small as z+1 where z is the dimensionality of the Euclidean space in which the graph is embedded) without loss of relevant graph information. Moreover, by employing the disclosed graph models it is possible to integrate isometric, isomorphic, and/or homeomorphic similarity measures, including metrics comparing vertex, edge, or higher-order features, into a single parametric cost function which can be trained using a suitable training set of graph pairs in order to optimize the cost function for a particular application.

The approaches disclosed herein substantially reduce computational complexity and time by reducing the graph comparison problem to one of comparing two graphs of small maximal clique size. These approaches also provide substantially enhanced comparison flexibility by providing a cost function comprising a parameterized combination of isometric, isomorphic, and/or homeomorphic similarity measures including feature aspects. Still further, these approaches enable this flexibility to be tuned automatically using training of the parametric cost function respective to a set of (optionally application-specific) training samples.

To develop these approaches, the cost function of Equation (1) which implements isometric comparison is revisited. This cost function entails summation over the complete set of vertex pairs $V^2$ of the graph $\mathcal{G}$, which can be computationally difficult or even prohibitive for large graphs. However, for exact isometric matching of the two graphs $\mathcal{G}$ and $\mathcal{G}'$, it is sufficient to consider only a sub-set $E^{VM}$ of the vertex pairs $V^2$ of the graph $\mathcal{G}$ which form a vertex model graph $\mathcal{G}_{VM} = (V, E^{VM})$. See, e.g., McAuley et al., "Graph rigidity, cyclic belief propagation and point pattern matching", IEEE Trans. on PAMI, vol. 30 no. 11, pages 2047-54 (2008). To be a sufficient representation for isometry analysis, the graph $\mathcal{G}_{VM} = (V, E^{VM})$ should include every vertex of the graph $\mathcal{G}$ in at least one pair, and additionally the vertex pairs of the set of edges $E^{VM}$ should define the vertex model graph $\mathcal{G}_{VM}$ as a globally rigid graph. If these conditions are met, then it follows that all vertices of the graph $\mathcal{G}$ are represented by the edges $E^{VM}$ and all distances between vertices are preserved by the edges $E^{VM}$. The isometry cost measure of Equation (1) can be replaced by the following isometry cost measure:

$$g_{isometric}(\mathcal{G}, \mathcal{G}') = \underset{f:V \to V'}{\operatorname{argmin}} \left\{ \sum_{(p_1, p_2) \in E^{VM}} |d(p_1, p_2) - d(f(p_1), f(p_2))| \right\}, \quad (4)$$

With reference to FIG. 1, a suitable vertex model graph $\mathcal{G}_{VM}$ is described, which meets the objectives of (i) including all vertices of the graph $\mathcal{G}$ and (ii) being globally rigid and (iii) having a small maximal clique size. The topmost image of FIG. 1 depicts the nodes or vertices of a generic graph $\mathcal{G}$. Because only isometry is under consideration in FIG. 1, the edges of the graph $\mathcal{G}$ are not depicted. In general, an edge could be present between any pair of nodes shown in FIG. 1. The graph $\mathcal{G}$ shown in FIG. 1 includes n nodes with the representative nodes 1,2,3,4,5,6,n−3,n−2,n−1,n depicted. The vertex model graph $\mathcal{G}_{VM}$ is depicted in the middle portion of FIG. 1, and is formed by including all n nodes of the graph $\mathcal{G}$ and edges sufficient to ensure global rigidity and a maximum clique size of 3. Note that the spatial layout of nodes shown in the diagrammatically depicted $\mathcal{G}_{VM}$ is not shown to shape or scale, but the diagrammatically depicted edges $E^{VM}$ of $\mathcal{G}_{VM}$ are to be understood as mathematically maintaining the spatial relationships of the nodes of the graph $\mathcal{G}$. The illustrative graph model $\mathcal{G}_{VM}$ is of the junction tree type, and is formed by interconnecting nodes 1,2,3 as a clique, interconnecting nodes 2,3,4 as a clique, and so forth ending with interconnection of nodes n−2,n−1,n as a clique. Thus, the maximum clique size is three. The cliques are shown in the diagrammic representation CLI shown at the bottom of FIG. 1. More generally, other vertex graph models can be employed which (i) include all nodes or vertices of the graph $\mathcal{G}$ and (ii) have edges sufficient to make the vertex graph model globally rigid so as to preserve the spatial arrangement of the nodes of the graph $\mathcal{G}$ in Euclidean space and (iii) have edges arranged to produce a small maximum clique size for the vertex graph model. For example, it is straightforward to add additional edges to extend the illustrated junction tree model to larger maximum clique size, such as adding edges to form cliques 1,2,3,4, 2,3,4,5, and so forth ending with the clique n−3,n−2,n−1,n so that the maximum clique size is four.

In some embodiments, an additional node M is also included (shown in phantom in FIG. 1, and the node M is included in every clique. In this case, the cliques are M,1,2,3, M,2,3,4, and so forth ending with the clique M,n−2,n−1,n. In this variant vertex model graph, the maximum clique size is formally four. The vertex M is a boolean variable indicating whether or not the template pattern in the graph $\mathcal{G}$ appears reflected in the target graph $\mathcal{G}'$, and generally does not significantly affect graph similarity computation time or complexity. The additional node M is suitably included to handle reflections (which enables handling isometries), in which case the maximal clique size should be at least four. On the other hand, if reflections are not of interest, then the maximal clique size should be at least three.

If the vertex model graph $\mathcal{G}_{VM}$ has small maximal cliques (such as maximum clique size 3 or 4 in the embodiment illustrated in FIG. 1), then Equation (4) can be modeled as inference in a tractable graphical model whose nodes and assignments correspond to points in V and V' respectively. Computation time and memory requirements for this inference are expected to be of order $O(|V||V'|^{n+1})$, where n is the number of dimensions and the graphical model is of the ring type. The illustrative junction tree vertex model graph of FIG. 1 has the additional advantage that only a single iteration is sufficient to perform exact inference.

The junction tree vertex model graph of FIG. 1 with maximum clique size k=3 is globally rigid when embedded in a two-dimensional Euclidean space. To show this, first consider the case in which n≦3. In this case, all edges of the graph $\mathcal{G}$ are encoded by the vertex model graph $\mathcal{G}_{VM}$, and global rigidity is trivially assured. To address a larger the graph $\mathcal{G}$ for which n>3, assume that the positions of the nodes 1,2,3(=k) are determined (which is assured by selecting the first clique as 1,2,3 as in FIG. 1). The distances of the next node 4(=k+1) from the node 2(=k−1) and the node 3(=k) are by making the next clique 2,3,4 (that is, by making the next clique k−1,k,k+1). From this, it is assured that node 4(=k+1) may occupy precisely two positions. The two positions result in an apposite sign for the determinant $$\begin{vmatrix} \text{node } (k-1) & -\text{node } (k+1) \\ \text{node } (k) & -\text{node } (k+1) \end{vmatrix}.$$

If the correct sign is determined by the variable optional node M, then the position of node 4(=k+1) is uniquely determined. The analysis for additional nodes k+2,k+3, . . . follows by induction. The foregoing is for embedding in a two-dimensional Euclidean space; however, generalization to a higher-dimensional (e.g., z-dimensional) Euclidean space is straightforward by increasing the maximum clique size of the junction tree to the dimensionality of the space plus one (that is, to z+1). For example, when embedding in a three-dimensional Euclidean space the junction tree should have maximum clique size of four, e.g. cliques 1,2,3,4, 2,3,4,5, . . . , n−3,n−2,n−1,n.

The foregoing has considered only isometric graph comparison, for which graph edges are not considered. Isomorphic or homeomorphic graph comparisons further incorporate the edges, as in Equations (2) and (3). The isomorphic and homeomorphic cost functions of Equations (2) and (3) can be generalized as follows:

$$g(\mathcal{G},\mathcal{G}') = \underset{f:V\to V'}{\operatorname{argmin}} \left\{ \sum_{(p_1,p_2)\in V^2} |d(p_1, p_2) - d(f(p_1), f(p_2))| + \sum_{(p_1,p_2)\in E} |h(p_1, p_2) - h(f(p_1), f(p_2))| \right\}, \quad (5)$$

where the function h( . . . ) can be an indicator function (for an isomorphic term), a shortest path distance (for a homeomorphic term), or may be more complex so as to incorporate comparison of edge features.

The first term of Equation (5) is the isometric term, and could in principle be replaced by Equation (4). However, there is no assurance that the edges $E^{VM}$ of the vertex model graph $\mathcal{G}_{VM}$ include all edges E of the graph $\mathcal{G}$, and so the second term of Equation (5) cannot employ the vertex model graph $\mathcal{G}_{VM}$. In general, this deficiency of the vertex model graph $\mathcal{G}_{VM}$ cannot be remedied by simply adding the missing edges to $\mathcal{G}_{VM}$, because this could result in increased maximum clique size for $\mathcal{G}_{VM}$ and consequent loss of computational advantages afforded by the small maximum clique size of the vertex model graph $\mathcal{G}_{VM}$.

To enable unification or integration of the isometric approach of Equation (4) and the isomorphic, homeomorphic, or other topology-based term of Equation (5), the vertex model graph $\mathcal{G}_{VM}$ is extended to a general model graph $\mathcal{G}_M = (V^{ext}, E^M)$ by (i) replicating vertices having edges that are not included in the vertex model graph $\mathcal{G}_{VM}$ to produce the extended set of vertices $V^{ext}$ and (ii) adding the edges that are missing from the vertex model graph $\mathcal{G}_{VM}$ connecting with the replicated vertices so as to maintain the desired small maximum clique size. The extended set of edges is denoted $E^M$ and includes all edges in $E^{VM}$ plus any additional edges from the graph $\mathcal{G}$ that were missing from $E^{VM}$. A replicate vertex or node has the same spatial coordinates as the original vertex or node and has the same node features (if any) as the original vertex or node.

Figure 2:
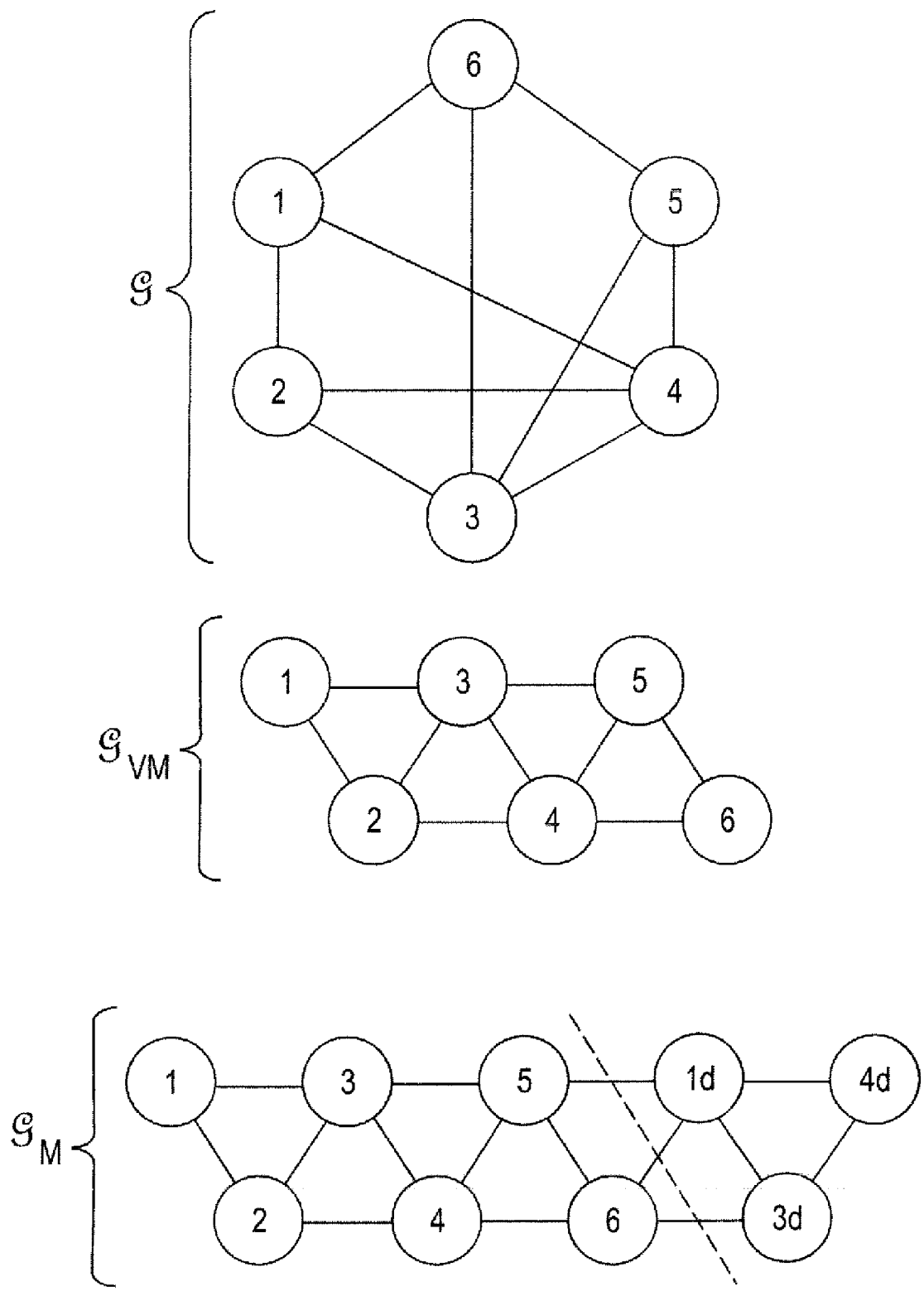

With reference to FIG. 2, an illustrative example of generating the model graph $\mathcal{G}_M = (V^{ext}, E^M)$ is described. The top of FIG. 2 illustrates an example of a graph $\mathcal{G} = (V,E)$, including a diagrammatic representation of the edges E. The middle of FIG. 2 shows the vertex model graph $\mathcal{G}_{VM} = (V, E^{VM})$ generated using the approach described herein with reference to FIG. 1. It is observed that the vertex model graph $\mathcal{G}_{VM}$ is missing certain edges that are present in the original graph $\mathcal{G}$, including the edge between the vertex pair (1,4), the edge between the vertex pair (3,6), and the edge between the vertex pair (1,6). Moreover, these edges cannot simply be inserted into the vertex model graph $\mathcal{G}_{VM}$ because the result would be an increased maximum clique size, since for example a clique (3,4,5,6) of size four would be created.

Rather, as shown at the bottom of FIG. 2, the vertex model graph $\mathcal{G}_{V_M}$ is extended by: adding a vertex 1d replicating the vertex 1 in order to add the edge (1,6); adding a vertex 3d replicating the vertex 3 in order to add the edge (3,6); and adding a vertex 4d replicating the vertex 4 in order to add the edge (1,4). The resulting extended graph is referred to herein as the model graph $\mathcal{G}_M = (V^{ext}, E^M)$ and retains the maximum clique size of three (or four if the optional additional vertex or node M is added as shown in FIG. 1) of the vertex model graph $\mathcal{G}_{V_M}$. This is achievable because the replicate nodes enable adding missing edges without concurrently increasing the clique size.

Equation (5) can be modified to employ the model graph $\mathcal{G}_M = (V^{ext}, E^M)$ as follows:

$$g(\mathcal{G}, \mathcal{G}') = \underset{f:V \to V'}{\operatorname{argmin}} \left\{ \sum_{(p_1, p_2) \in E^M} (|d(p_1, p_2) - d(f(p_1), f(p_2))| + \right. \tag{6}$$

$$\left. |h(p_1, p_2) - h(f(p_1), f(p_2))|) \right\},$$

where the summation is over the vertex pairs that are connected by edges $E^M$ in the model graph $\mathcal{G}_M = (V^{ext}, E^M)$. Because the model graph $\mathcal{G}_M = (V^{ext}, E^M)$ remains both globally rigid and of low maximal clique size, Equation (6) remains tractable. Further, it can be shown that any replicated vertex or node will map to the same value, assuming that an isometric isomorphism/homeomorphism exists between the original graph $\mathcal{G}$ and the comparison graph $\mathcal{G}'$. This can be shown as follows. Assume the image of nodes 1, ..., k corresponds to an isometric isomorphism/homeomorphism under the mapping f (and thus we can determine the binary node M). This mapping will have zero cost. Suppose node k+1 is a copy of a previous node J. Given the values of nodes k−1, k, and M, it is known that there is at most one value for f(k+1) which incurs zero cost. Since f(k+1)=f(J) incurs zero cost, the minimum cost solution for the model M, 1, ..., k+1 has f(k+1)=f(J). Again, the proof follows by induction.

The extended set of vertices or nodes $V^{ext}$ has size of order $O(|V|+|E|)$. While finding the most efficient construction of the model graph $\mathcal{G}_M = (V^{ext}, E^M)$ (for example, as measured by the number of node replications) is complex; however, it is straightforward to ensure the number of added nodes is no more than 2|E|, since this upper limit corresponds to adding two node replications for each missing edge. Accordingly, Equation (6) can be solved in time and space $O(|V||V'|^{n+1})$. For sparse graphs in 2D spaces, the running time is expected to be no worse than $O(|V||V'|^3)$. For sparse graphs the approximation $O(|V|)=O(|E|)$ is suitably made.

The foregoing model can be applied under transformations other than isometries, for instance to the problem of subgraph isomorphism/homeomorphism under perspective projection or affine transformation. The number of free parameters in the transformation determines the suitable maximal clique size for the model. For isometries in two-dimensional images, the maximal cliques size can be as small as three (see FIG. 1 and related discussion), resulting in an asymptotic complexity of $O((|V|+|E|)|V'|^3)$.

The cost measure of Equation (6) is tractable due to the small maximal clique size for the model graph $\mathcal{G}_M = (V^{ext}, E^M)$, and can readily represent isometry, isomorphism, homeomorphism, and various combinations thereof. To further extend the cost measure to accommodate various node and edge features, as well as third-order features (which are accessible due to the model graph $\mathcal{G}_M$ having cliques of size three or greater), Equation (6) can be written as:

$$g(\mathcal{G}, \mathcal{G}') = \underset{f:V \to V'}{\operatorname{argmin}} \left\{ \sum_{p_1 \in \mathcal{G}_M} \left\langle \underbrace{\Phi^1(p_1, f(p_1))}_{\text{node features}}, \theta^{nodes} \right\rangle + \right. \tag{7}$$

$$\sum_{(p_1, p_2) \in \mathcal{G}_M} \left\langle \underbrace{\Phi^2(p_1, p_2, f(p_1), f(p_2))}_{\text{edge features}}, \theta^{edges} \right\rangle +$$

$$\left. \sum_{(p_1, p_2, p_3) \in \mathcal{G}_M} \left\langle \underbrace{\Phi^3(p_1, p_2, p_3, f(p_1), f(p_2), f(p_3))}_{\text{3rd order features}}, \theta^{3rd} \right\rangle \right\},$$

The use of general functions $\Phi^1, \Phi^2, \Phi^3$ enables incorporation of node, edge, and third-order features, respectively. For example, to provide good performance for near-exact matching (as opposed to exact matching), first-order features such as shape context or SIFT features may optionally be incorporated. The third order features may include, for example, preservation of angles or triangle similarity.

Advantageously, the form of the cost function g given in Equation (7) is conducive to implementation using structured learning. Specifically, the weights $\theta^{nodes}, \theta^{edges}, \theta^{3rd}$ can be learned based on a training set of graph pairs in order to optimize Equation (7) for a specific graph comparison task. This is facilitated by the linear parameterization of Equation (7) according to $\Theta = (\theta^{nodes}, \theta^{edges}, \theta^{3rd})$. The column-generation procedure should also be tractable. To satisfy this latter condition, a loss function of the form $\Delta(\hat{g}, g)$ that decomposes over the nodes of the model is suitably specified. The loss function indicates the cost of choosing the mapping $\hat{g}$ when the correct mapping is g. A suitable loss function is the normalized Hamming loss function, given by:

$$\Delta(\hat{g}, g) = 1 - \frac{1}{|V'|} \sum_{p \in V'}^{N} I_{\{g(p)\}}(\hat{g}(p)). \tag{8}$$

The goal of the structured learning is to find a parameter vector $\Theta = (\theta^{nodes}, \theta^{edges}, \theta^{3rd})$ which minimizes a regularized risk:

$$\hat{\Theta} = \underset{\Theta}{\operatorname{argmin}} \left\{ \underbrace{\frac{1}{N} \sum_{i=1}^{N} \Delta(\hat{g}^i, g^i)}_{\text{empirical risk}} + \underbrace{\frac{\lambda}{2} \|\Theta\|_2^2}_{L_2 \text{ regularizer}} \right\}, \tag{9}$$

where $g^1, \ldots, g^N$ is a training set of graph pairs (or, more precisely, a training set of globally rigid model graphs $\mathcal{G}_M = (V^{ext}, E^M)$ of low maximal clique size generated as described herein with reference to FIGS. 1 and 2), and λ is a regularization constant. Equation (9) can be minimized using various optimization algorithms, such as the Bundle Methods for Risk Minimization (BMRM) solver. See Teo et al., "A scalable modular convex solver for regularized risk minimization", in KDD 2007.

Figure 3:
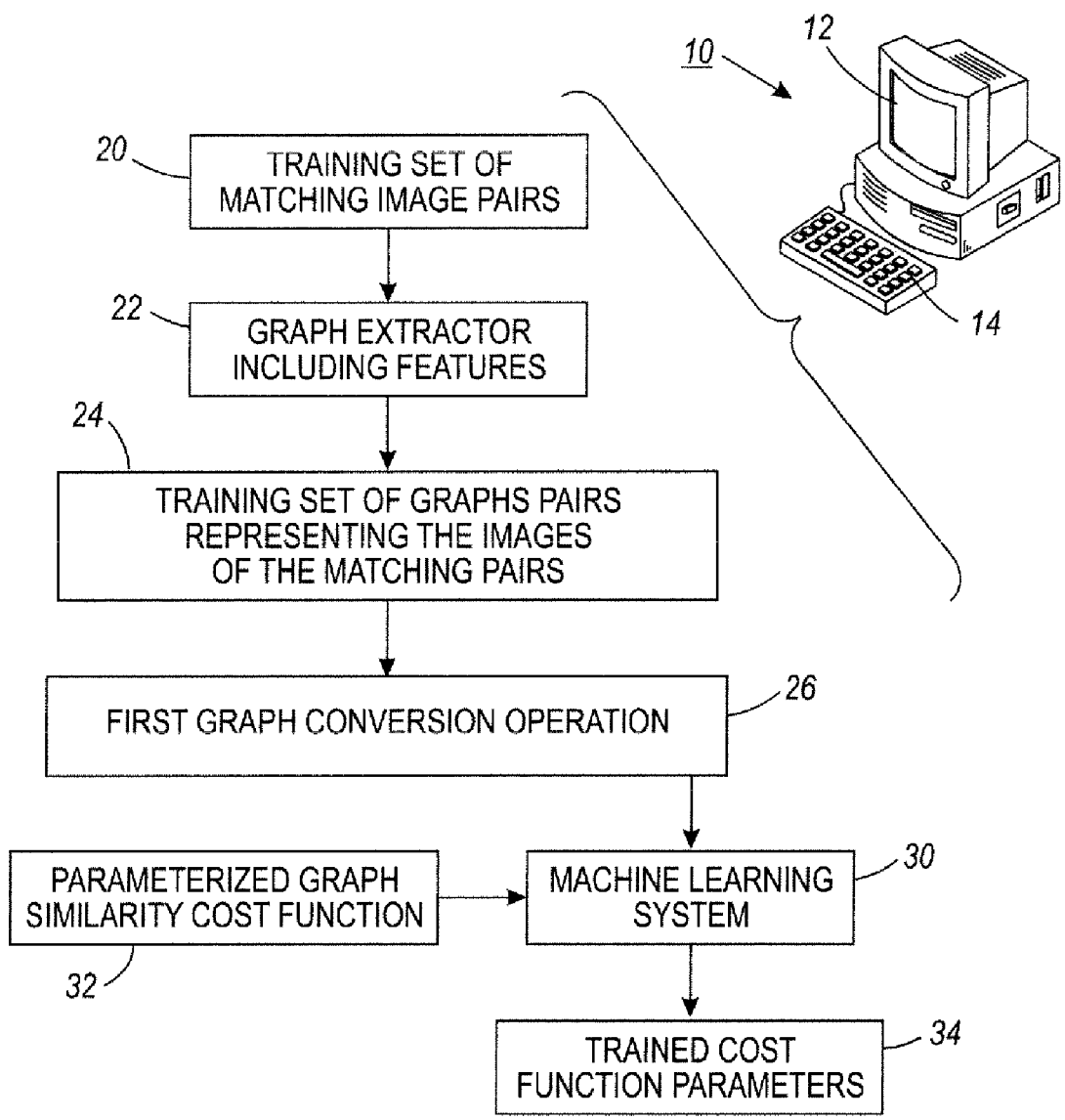
FIG. 3 diagrammatically shows a parameterized graph similarity cost function training system.
Figure 4:
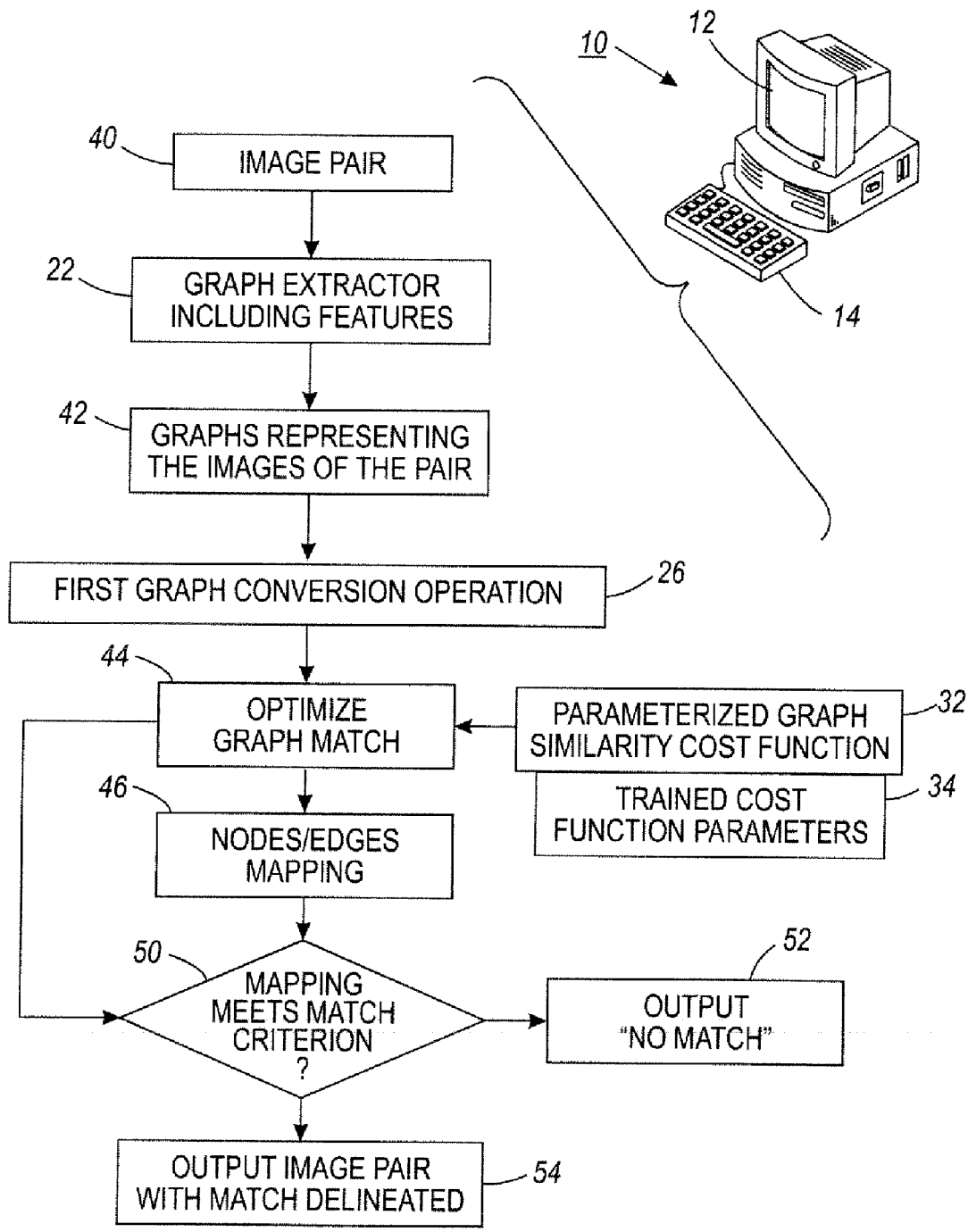
FIG. 4 diagrammatically shows an object comparator that employs the graph similarity cost function trained using the system of FIG. 3.

With reference to FIGS. 3 and 4, an illustrative graph matching system employing the techniques disclosed herein is described. A digital system includes a computer 10 or other digital processing device that includes a digital processor (not shown). The digital processor can be variously embodied, such as by a single-core processor, a dual-core processor (or more generally by a multiple-core processor), a digital processor and cooperating math coprocessor, a digital controller, or so forth. The illustrated computer 10 is a desktop or laptop computer including a display 12 and a keyboard 14. Other interfacing devices, such as a second monitor, a mouse or trackball, or so forth can also be included. On the other hand, the illustrated computer 10 can be replaced by another digital processing device such as a network server having only network interfacing (for example, Internet or local area network (LAN) interfacing), or so forth. The computer 10 is configured by suitable programming or hardwired firmware to embody a parameterized graph similarity cost function training system as diagrammatically represented in FIG. 3, and to embody an object comparator that employs the trained graph similarity cost function as diagrammatically represented in FIG. 4.

It is also contemplated for a different digital device, such as a graphical processing unit (GPU), network server, or so forth embody these systems. Further, it is contemplated for the training system of FIG. 3 and the object comparator of FIG. 4 to be embodied by different digital devices. For example, the training system of FIG. 3 may be embodied by a vendor-owned computer located at a product vendor location, while the object comparator of FIG. 4 may be embodied by a different end user-owned computer located at an end user location different from the vendor location.

The disclosed training system and/or object comparator can also be embodied as a storage medium storing instructions which when executed on the illustrated computer 10 or on another digital processing device or devices embody the illustrated systems. The storage medium (not shown) may be, for example: a hard disk or other magnetic storage medium; an optical disk or other optical storage medium; a random access memory (RAM) chip or set of RAM chips; a read-only memory (ROM) chip or set of ROM chips; a FLASH memory; or so forth. The storage medium may be integral with the computer 10 (for example, an internal hard drive or RAM), or may be separate (for example, an external hard drive operatively connected with the computer 10), or may be separate and accessed via a digital data network such as a local area network (LAN) or the Internet (for example, as a redundant array of inexpensive or independent disks (RAID) or other network server storage that is indirectly accessed by the computer 10 via a digital network).

As used herein, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value. The term "cost function" as used herein is intended to encompass conventional cost functions for which a smaller value indicates lower cost, for example, as in the cost function of Equation (7), where the cost function is the argument of $$\operatorname*{argmin}_{f:V \to V'}\{\ldots\}$$

and is to be minimized by selecting the optimal mapping $f:V \to V'$. Additionally, the term "cost function" as used herein is intended to encompass less conventional cost functions in which a larger value indicates lower cost (for example, using a mapping of the form $$\operatorname*{argmax}_{f:V \to V'}\{\ldots\}$$

where the argument of the argmax function is a cost function for which a larger value indicates lower cost).

In the following, the objects are assumed to be images, and graphs are extracted from the images. A graph extracted from an image represents the image or a subject depicted in the image. For example, a portrait image may be processed to extract a graph that represents the face depicted in the portrait image. Although images are used as illustrative objects herein, other objects are also contemplated. For example, the objects could be three-dimensional structures of a folded proteins.

Turning to FIG. 3, a training set of matching image pairs 20 is processed by a graph extractor 22 to generate a training set 24 of matching image pairs represented as graphs. The graph extractor 22 may, for example, employ the computer 10 as a user interface via which a user may manually identify vertices or nodes of objects shown in the images, after which edges and node, edge or third-order features are added automatically (for example, using a spanning tree to ensure that a connected graph is generated, or by connecting K-nearest neighbors), or by user selection. Matching objects (and hence matching graphs) are also identified by the user. As another illustrative example, if the object is a three-dimensional structure of a folded protein, the graph extractor 22 suitably may generate the graph automatically be defining each atom as a node or vertex having as a feature the atomic species, and defining edges as bonds between atoms with features corresponding to bond strength or type, and third order features may optionally be defined in terms of bond angles or the like. Optional user interfacing in this case may entail the user selecting a portion of the three-dimensional folded protein structure to be matched (as opposed to attempting to match the entire protein).

In a processing operation 26, for each graph pair of the training set 24, one graph (e.g., the first graph) is converted to a globally rigid model graph $\mathcal{G}_M = (V^{ext}, E^M)$ of low maximal clique size that includes node or vertex replications as appropriate in order to encode all edges of the original graph. The operation 26 suitably employs the processing described herein with reference to FIG. 1 in which the vertex model graph $\mathcal{G}_{VM} = (V, E^{VM})$ of low maximal clique size is generated, and the processing described herein with reference to FIG. 2 in which the vertex model graph is extended to include missing edges (if any) by addition of replicate nodes and the missing edges to form the globally rigid model graph $\mathcal{G}_M = (V^{ext}, E^M)$ of low maximal clique size that encodes all edges of the original (first) graph. This processing is applied to only one graph of each graph pair, e.g. the first or "template" graph $\mathcal{G}$, while the other graph, e.g. the second or "target" graph $\mathcal{G}'$ is not processed in this way. Said another way, the processing of conversion operation 26 converts the first, i.e. template, graph $\mathcal{G}$ to the globally rigid model graph $\mathcal{G}_M = (V^{ext}, E^M)$ as disclosed herein, while the second, i.e. target, graph $\mathcal{G}'$ is not modified by the operation 26. The output of the conversion operation 26 is the training set of model graph pairs $g^1, \ldots, g^N$ that serve as input to Equation (9). A machine learning system 30 optimizes parameters of a parameterized graph similarity cost function 32 so as to generate trained cost function parameters 34. For example, cost function 32 can be as set forth in Equation (7) with the parameters being $\Theta = (\theta^{nodes}, \theta^{edges}, \theta^{3rd})$, and the machine learning system 30 can employ the BMRM solver or another machine learning algorithm to minimize the regularized risk set forth in Equation (9) including the normalized Hamming loss function as set forth in Equation (8). The trained cost function parameters 34 are the optimized values of the parameters $\Theta = (\theta^{nodes}, \theta^{edges}, \theta^{3rd})$.

With reference to FIG. 4, an object comparator employs the trained graph similarity cost function 32, 34 defined by the parameterized cost function 32 employing the optimized parameters 34. An image pair 40 is received for comparison. The graph extractor 22 is applied to each image of the image pair 40 to extract a corresponding graph representing the image (or, representing a subject depicted in the image) so as to generate a graph pair 42 corresponding to the image pair 40. The conversion operation 26 is applied to the first or template graph of the graph pair 42 to convert the first graph to a globally rigid model graph $\mathcal{G}_M = (V^{ext}, E^M)$ of low maximal clique size and including node or vertex replications as appropriate in order to encode all edges of the original graph. Again, this is suitably done in accordance with the processing described herein with reference to FIGS. 1 and 2. An optimization operation 44 optimizes the mapping f:V→V' using the trained cost graph similarity cost function 32, 34 defined by the parameterized cost function 32 employing the optimized parameters 34. Again, the graph similarity cost function 32 is suitably given in Equation (7) in the illustrative embodiments. The output of the optimization operation 44 is the optimized mapping f:V→V' 46 which maps nodes and edges of the two graphs.

In general, the optimization operation 44 always generates an optimized mapping f:V→V' 46 which minimizes the trained graph similarity cost function 32, 34. However, if the two images are not very similar, then this optimized mapping f:V→V' 46 may be poor, that is, the "matched" nodes may actually be rather different in spatial location and/or attributes, "matched" edges may be different, or so forth, third-order features may not actually match very well, or so forth. Accordingly, an assessment operation 50 assesses whether the optimized mapping f:V→V' 46 is satisfactory. This assessment can utilize various criteria. For example, in some approaches the optimized value of the trained cost function 32, 34 is used to assess the match. In other approaches, the optimized mapping f:V→V' 46 is quantified by other measures such as: an average distance between "matched" nodes; a number of unmatched edges; measures of feature differences for matched nodes or edges; or so forth. If the assessment operation 50 indicates that the optimized mapping f:V→V' 46 is unsatisfactory, then an output operation 52 outputs "no match" or the like, for example by displaying "no match" on the display 12. On the other hand, if the assessment operation 50 indicates that the optimized mapping f:V→V' 46 is satisfactory, then the match is presented to the user in an operation 54. For example, the operation 54 may display the two images in an overlay mode, with the two images spatially registered using the matching nodes as reference points for rigid or nonrigid spatial registration.

The object comparator of FIG. 4 can readily be modified for other applications. For example, in the case of a database retrieval operation the image pair 40 may include a reference image and an image retrieved from a database. The graph extractor 22 preferably employs an automated graph extraction operation, and the assessment operation 50 does not display the outputs 52, 54 but rather decides whether the image retrieved from the database is a match for the reference image and, if so, includes the image retrieved from a database as a matching image for inclusion in the final output of the image retrieval operation. In this application, if the reference image serves as the template (i.e., first) image that is converted by the conversion operation 26, then this conversion operation 26 is suitably applied only once and the resulting model graph is then used for comparison with each target (i.e., second) image retrieved from the database.

In a similar database retrieval operation for proteins, the reference object is suitably a portion of a three-dimensional folded protein structure selected by a user, and the retrieval operation identifies other proteins stored in a proteins database which have a folded protein structure including a portion similar to the selected reference protein structure portion.

The disclosed graph matching techniques have been reduced to practice and applied to graphs extracted from images. In some experiments, Equation (7) was applied without any node features (thus in effect employing Equation (6) as the graph similarity cost measure). These experiments provided good results, thus indicating that graph similarity can be characterized using the disclosed techniques using only a combination of isometric and isomorphic/homeomorphic measures. The disclosed graph matching techniques were also found experimentally to be robust against outliers or other reasonable levels of noise, and the expected fast execution due to the use of model graphs of small maximal clique size was confirmed experimentally.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method comprising:
    representing a first graph in Euclidean space by a first model graph that includes all vertices of the first graph, all edges of the first graph, and at least one replicate vertex of the first graph, and is globally rigid and has a preselected maximum clique size; and
    computing a mapping between vertices of the first graph and vertices of a second graph by optimizing a mapping between vertices of the first model graph and vertices of the second graph respective to a cost function wherein the cost function includes at least a nodes term that assigns a cost to differences between vertices of the first model graph and mapped vertices of the second graph and an edges term that assigns a cost to differences between edges between vertex pairs of the first model graph and edges between mapped vertex pairs of the second graph;
    wherein the representing operation and the computing operation are performed by a digital processor.

2. The method of claim 1, wherein the cost function further includes (iii) a third order features term that assigns a cost to differences between third order features of vertex cliques of the first model graph and third order features of mapped vertex cliques of the second graph.

3. The method of claim 1, further comprising:
training the cost function based on a set of graph pairs that are labeled respective to similarity.

4. The method of claim 1, wherein the edges term includes at least one of an isometric, an isomorphic, and a homeometric term.

5. The method of claim 1, wherein the representing operation comprises:
representing vertices of the first graph by a first vertex model graph including all vertices of the first graph and edges effective for the first vertex model graph to be globally rigid and to have the preselected maximum clique size; and
generating the first model graph by extending the first vertex model graph to include all edges of the first graph by (i) replicating vertices that in the first graph connect with edges that are missing from the first vertex model graph and (ii) adding the edges that are missing from the first vertex model graph to connect with the replicated vertices.

6. The method of claim 1, wherein the representing operation comprises:
representing the first graph by the first model graph comprising one or more copies of each vertex of the first graph and a number and arrangement of edges effective for the first model graph to (i) be globally rigid and (ii) have the preselected maximum clique size and (iii) include all edges of the first graph.

7. The method of claim 6, wherein the preselected maximum clique size is selected from a group consisting of three and four.

8. A method comprising:
representing a first graph in Euclidean space by a first model graph that includes all vertices of the first graph and all edges of the first graph and is globally rigid and has a preselected maximum clique size;
computing a mapping between vertices of the first graph and vertices of a second graph by optimizing a mapping between vertices of the first model graph and vertices of the second graph respective to a cost function; and
retrieving an object corresponding to the second graph conditional upon the computed cost function satisfying a retrieval criterion;
wherein the representing, computing, and retrieving operations are performed by a digital processor.

9. The method of claim 8, wherein the representing operation comprises:
representing vertices of the first graph by a first vertex model graph including all vertices of the first graph and edges effective for the first vertex model graph to be globally rigid and to have the preselected maximum clique size; and
generating the first model graph by extending the first vertex model graph to include all edges of the first graph by (i) replicating vertices that in the first graph connect with edges that are missing from the first vertex model graph and (ii) adding the edges that are missing from the first vertex model graph to connect with the replicated vertices.

10. The method of claim 8, wherein the representing operation comprises:
representing the first graph by the first model graph comprising one or more copies of each vertex of the first graph and a number and arrangement of edges effective for the first model graph to (i) be globally rigid and (ii) have the preselected maximum clique size and (iii) include all edges of the first graph.

11. The method of claim 10, wherein the preselected maximum clique size is selected from a group consisting of three and four.

12. The method of claim 10, wherein the preselected maximum clique size is three.

13. The method of claim 8, wherein:
the first model graph includes all vertices of the first graph and at least one replicate vertex of the first graph.

14. A non-transitory storage medium storing instructions executable by a digital processor to perform a method at least in part operative on graphs embedded in a Euclidean space of dimensionality n, the method comprising:
representing a first graph in the Euclidean space by a first model graph by (i) adding all vertices of the first graph to the first model graph with edges between the vertices sufficient to maintain global rigidity with a maximum clique size less than or equal to n+2, and (ii) adding any missing edges that are included in the first graph but are missing from the first model graph by adding one or more replicate vertices of the first graph to the first model graph and adding the missing edge or edges connecting with the replicate vertex or vertices; and
computing a mapping between vertices of the first graph and vertices of a second graph by optimizing a mapping between vertices of the first model graph and vertices of the second graph.

15. The non-transitory storage medium as set forth in claim 14, wherein the computing comprises:
optimizing a mapping between vertices of the first model graph and vertices of the second graph respective to a cost function.

16. The non-transitory storage medium as set forth in claim 14, wherein the stored instructions are executable by a digital processor to perform the method further comprising:
generating the first graph from a first two-dimensional image and the second graph from a second two-dimensional image, wherein n=2.

17. An apparatus comprising:
a digital processor configured to perform a method operative in a Euclidean space of dimensionality n, the method including:
modeling a first graph embedded in the Euclidean space by a globally rigid first model graph that includes all vertices and edges of the first graph and has a preselected maximum clique size; and
computing a mapping between vertices of the first graph and vertices of a second graph by optimizing a mapping between vertices of the first model graph and vertices of the second graph;
wherein the modeling is configured to maintain the preselected maximum clique size of the first model graph by employing an edge adding process that replicates a vertex of a vertex pair connected by an edge; and
wherein the optimizing employs one of:
(i) a function of the form $$\operatorname*{argmin}_{f:V \to V'}\{c.f.\}$$

where c.f. is a cost function for which a smaller value indicates lower cost, and (ii) a function of the form $$\underset{f:V \to V'}{\operatorname{argmax}}\{c.f.\}$$

where c.f. is a cost function for which a larger value indicates lower cost.

18. An apparatus comprising:
a digital processor configured to perform a method operative in a Euclidean space of dimensionality n, the method including:
modeling a first graph embedded in the Euclidean space by a globally rigid first model graph that includes all vertices and edges of the first graph and has a preselected maximum clique size of n+2; and
computing a mapping between vertices of the first graph and vertices of a second graph by optimizing a mapping between vertices of the first model graph and vertices of the second graph;
wherein the modeling is configured to maintain the preselected maximum clique size of n+2 for the first model graph by employing an edge adding process that replicates a vertex of a vertex pair connected by an edge.

19. The apparatus as set forth in claim 18, wherein each clique includes a boolean variable node $M$ indicating whether a template pattern in the first graph $\mathcal{G}$ appears reflected in the second graph.

20. An apparatus comprising:
a digital processor configured to perform a method operative in a Euclidean space of dimensionality n, the method including:
modeling a first graph embedded in the Euclidean space by a globally rigid first model graph that includes all vertices and edges of the first graph and has a preselected maximum clique size of n+1; and
computing a mapping between vertices of the first graph and vertices of a second graph by optimizing a mapping between vertices of the first model graph and vertices of the second graph;
wherein the modeling is configured to maintain the preselected maximum clique size of n+1 for the first model graph by employing an edge adding process that replicates a vertex of a vertex pair connected by an edge.

* * * * *